United States Patent Office 3,269,221
Patented August 30, 1966

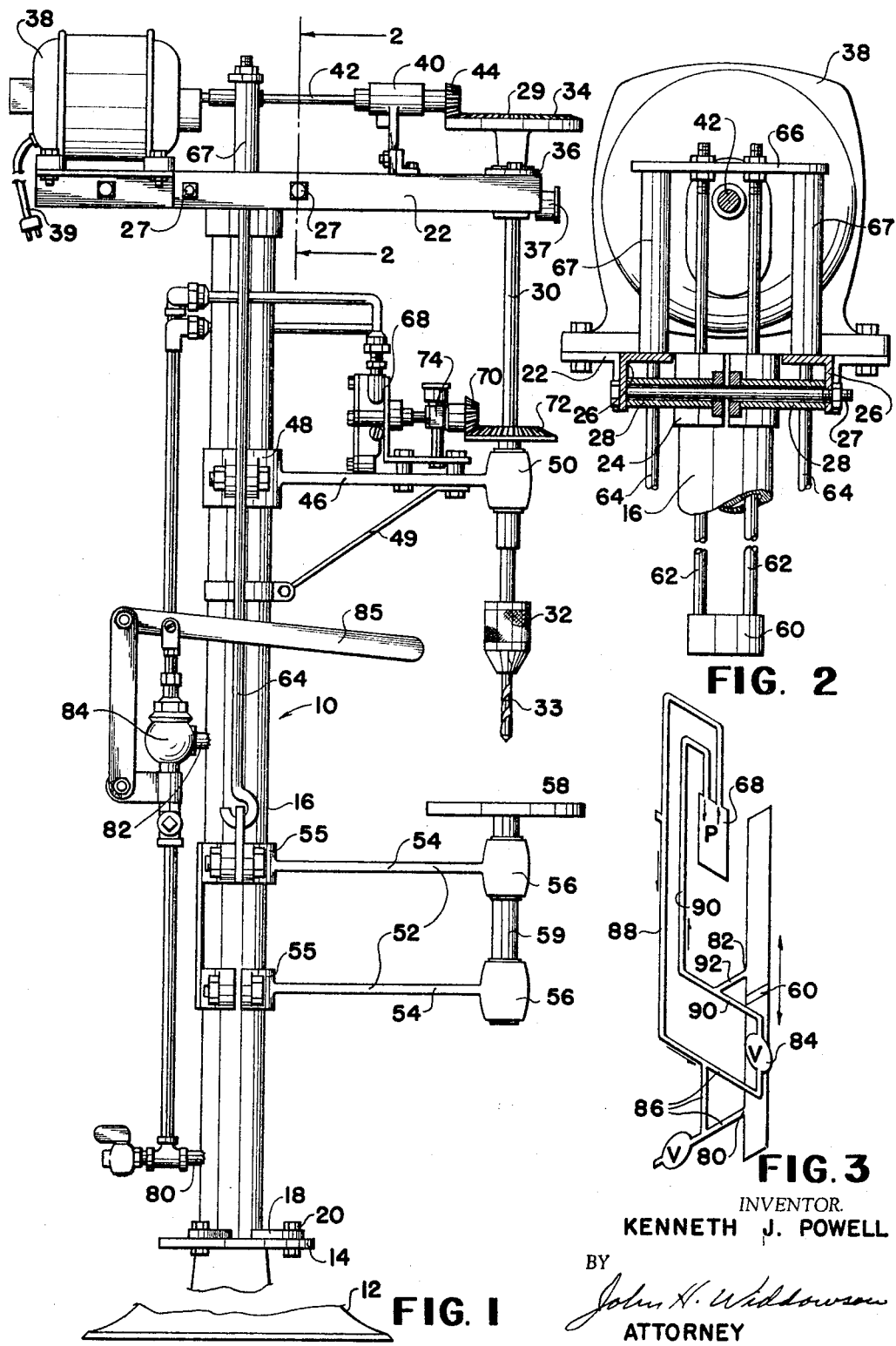

3,269,221
DRILLING AND CUTTING APPARATUS
Kenneth J. Powell, 860 Navajo, Salina, Kans.
Filed Nov. 26, 1963, Ser. No. 325,891
4 Claims. (Cl. 77—33.5)

This invention relates to cutting apparatus, more specifically to a drill press. Still more specifically this invention relates to a drill press, or other cutting and shaping apparatus, wherein a motor is used to actuate both the spindle, or other cutting tool support and move the work support relative to the spindle or other cutting tool. The invention relates to a drill press having a work support that is movable with a hydraulic means which utilizes novel and improved new structure, and provides a new degree of control thereover.

The broad concept of providing drilling, shaping, and/or cutting apparatus with a power means to move the work support relative to the drill shaping or cutting element is in general old in the art. However the application of this broad concept to these aforementioned types of apparatus has not been entirely satisfactory. In general, the application of the concept has been mainly restricted to huge cumbersome apparatus in general not suited for manual manipulation. The actuating or moving means are expensive and cumbersome, and are in many instances difficult to control. When these moving or actuating means for the apparatus are misused or inadvertently improperly operated there is the danger that the apparatus and/or the work will be broken or damaged. The operator of the apparatus can also become injured. The known apparatus having power operated actuated feed means does not provide adequate and automatic control to safeguard the operator, apparatus, and work.

I have invented a new cutting apparatus. The new cutting apparatus of my invention has an elongated support means, a work support means associated with the elongated support means, and a means for holding a cutting tool mounted on the elongated support means. A means is provided for supporting the work support and the means for holding a cutting tool in relative movable relationship. A power means is provided for actuating the means for holding a cutting tool and changing the relative distance between it and the work support.

A preferred specific embodiment of my cutting apparatus is a drill press. The drill press of my invention has a hollow upright post, a spindle means including a drill chuck, and a work support slidably mounted on the post. A motor is provided for driving the spindle means. A piston is slidably positioned within the hollow post and is connected to a piston rod means extending out of the top thereof. Hanger means are connected to the piston rod means and to the slidable work support. A hydraulic actuating means is provided to move the piston and the associated work support. The hydraulic actuating means has a fluid pump mounted in driving relationship to the motor, a valve, an aperture in the post below the piston, and a second aperture in the post above the piston. A conduit means is provided to transfer fluid via the fluid pump from the second aperture to the first aperture, thereby transferring fluid from above to below the piston, and a second conduit means having the valve embodied therein adapted to provide a means to pass fluid from the first aperture to said second aperture, thereby transferring fluid from beneath to above the piston, and also provide a recirculation passage for the fluid being pumped by the fluid pump into the first conduit means.

The cutting apparatus of my invention solves the problems associated with prior art cutting apparatus. It can be used in boring, drilling, shaping, etc. operations. My apparatus is simple and dependable in operation. It can be readily and inexpensively embodied and used on cutting and drilling apparatus regardless of size or shape. It is relatively inexpensive to use, produce and maintain. The structure of my invention having a piston disposed within a hollow upright supporting post is very compact and convenient. This arrangement provides for a fluid reservoir and a piston and cylinder actuating means that are convenient, compact and easy to service. My cutting and drilling apparatus is simple to use and provides an automatic safeguard to reduce the danger of breaking the apparatus, damaging the work, and/or injuring the operator. In preferred specific embodiments of my invention the same power means is used to power the cutting element and to feed the work to it, the two operations are correlated. Because of this correlation, the apparatus has an inherent automatic safeguard against breakage, etc. For example, when the drill bit is inadvertently or otherwise fed too rapidly, there will be a great deal of opposition to its rotation and the motor will slow down. When this happens the fluid pump will pump fluid at a slower rate to the hydraulic piston actuating means for the work support. When this happens the rate of movement of the work table, or the feed rate, will be thereby slowed down or halted. By reducing the feed rate, the motor will be given a chance to gain and maintain speed. This reduces the danger of burning out the motor, etc.

An object of this invention is to provide a new cutting apparatus.

Another object of this invention is to provide a cutting apparatus provided with a means to automatically feed the work to the cutting element.

Yet another object of this invention is to provide a drill press having a hydraulically actuated work table that moves the work relative to the cutting bit, which hydraulic system is powered by the same motor that rotates the drill bit.

Yet another object of this invention is to provide a cutting apparatus that is simple and safe to operate.

Another object of this invention is to provide a cutting apparatus that is inexpensive to produce and maintain.

Yet another object of this invention is to provide a cutting apparatus having a hydraulically actuated means to move the cutting element relative to the work.

Still another object of this invention is to provide a cutting apparatus having a hollow upright post with a piston means therein adapted to move the cutting element relative to the work support.

Other objects and advantages of the invention will be apparent to those skilled in the art from the disclosure set forth herein.

Drawings of preferred specific embodiments of the invention accompany and are a part hereof and such are to be undestood to not unduly limit the scope of the invention.

In the drawings,

FIG. 1 is a front elevational view of a preferred specific embodiment of the cutting apparatus of my invention.

FIG. 2 is a cross sectional view taken on line 2—2 of FIG. 1.

FIG. 3 is a schematic view of a specific embodiment of a hydraulic system of my invention.

The following is a discussion and description of the new cutting apparatus, more specifically the drill press apparatus embodiment of my invention made with reference to the drawings, wherein the same reference numerals are used to indicate the same or similar part and/or structure. The discussion and description are of preferred specific embodiments of the new cutting apparatus of my invention and it is to be understood that such are not to unduly limit the scope of my invention.

Referring now to the drawings FIGS. 1 to 3, there is shown in FIG. 1 a specific embodiment of my invention, namely a drill press. The drill press 10 of my invention has a broad circular base member 12 having an elevated flat horizontal mounting flange 14. A long hollow cylindrically shaped upright post 16 having a flange 18 on the bottom thereof is joined to the base 12 by bolts 20 securing flanges 14 and 18 in abutting relationship. A stationary horizontally disposed platform 22 is mounted on the top of post 16. The platform 22 is comprised of an annular clamp 24 secured to the top portion of post 16, and two parallel lengths of angle iron 26 secured to the annular clamp 24. The angle irons 26 are secured to clamp 24 by bolts 27 passing through apertures positioned in the angle irons 26, short lengths of tubing 28, and ear portions on the annular clamp 24. This mounting relationship is most clearly shown in FIG. 2 of the drawings. A spindle means 29 is mounted on one end of platform 22. Spindle means 29 has a vertically extending shaft 30 having a drill chuck 32 on the end thereof, and a bevel gear 34 mounted on the end opposite the drill chuck. A bearing means 36 mounted on the end of platform 22 rotatably supports the shaft 30 in vertically extending relation. A grease cup 37 can be provided to provide lubrication for bearing 36 if desired. An electric motor 38 is mounted on platform 22 on the end opposite the spindle means 29. Also mounted on the platform 22 is a bearing means 40 positioned adjacent the shaft 30. A horizontal shaft 42 is coupled to drive shaft of motor 38, and has a relatively small bevel gear 44 mounted on the end thereof in operative engagement with bevel gear 34.

Horizontal disposed platform 46 is positioned below platform 22 and is mounted on upright post 16. The platform 46 has an annular clamp means 48 encircling the post 16, and a diagonal brace 49 secured at one end to the post 16 at a point below this platform 46 and at the other end to the platform at a point spaced from the upright post 16. A bearing means 50 is mounted on the end of platform 46 and is aligned with the bearing means 36. Bearing means 50 and 36 rotatably support the shaft 30 of spindle means 29.

Slidably mounted on the upright post 16 is a movable work support 52. The work support 52 has two spaced parallel rods 54 positioned transversely of post 16. Relatively large annular portions 55 on adjacent ends of rods 54 encircle post 16 in slidable relationship thereto, and relatively small aligned annular portions 56 are provided on adjacent opposite ends of rods 54. A flat work table 58 having a tubular rod 59 secured to the bottom thereof is supported in annular portions 56 of rods 54 directly below the spindle means 29.

A piston 60 (shown in FIG. 2) is slidably disposed within the upright post 16. Spaced piston rods 62 are rigidly joined to piston 60 and extend upwardly with the top portions extending beyond the top of post 16. As shown in FIG. 2 the extending portions of piston rod 62 are positioned on opposite sides of the horizontal shaft 42. Two vertically extending work support rods 64 are joined at the lower ends thereof to the work support 52. The upper ends of rods 64 extend through apertures in the platform 22 and are joined to a bracket means 66. The extending end portions of piston rods 62 are also joined to bracket 66. Short tubular abutment means 67 are disposed about rods 64 to limit the downward movement of the work support 52. With the aforedescribed structure it is evident that movement of piston 60 will effect vertical movement of the work support 52.

A hydraulic actuating means is provided for the work support 52. The hydraulic actuating means includes a rotary fluid pump 68 having an inlet, and an outlet, and a shaft. The rotary pump 68 is mounted on platform 46. Secured to the shaft of pump 68 is a bevel gear 70 in operative engagement with a bevel gear 72 secured to the vertically extending shaft 30 above bearing 50. As shown in FIG. 1, a bearing means 74 is provided to support the shaft of pump 68. It can be seen that motor 38 drives both the spindle 29 and the fluid pump 68. If desired a switch or the like can be provided in line 39 supplying current to motor 38 to control same. An aperture 80 is disposed in the lower end of post 16 preferably beneath the lowermost point that piston 60 moves. A second aperture 82 is provided in post 16 preferably slightly above the top limit of movement of the piston 60. A manually operated valve 84 having an actuating handle 85 is shown mounted on the drill press 10. The conduit system of the actuating means is best illustrated in FIG. 3, which is a schematic of a preferred embodiment thereof. In FIG. 3 there is shown a conduit 86 connected at one end to aperture 80 and at the opposite end to valve 84. A second conduit 88 is connected at one end to conduit 86 and at the opposite end to pump 68. A third conduit means 90 is connected at one end to the inlet of pump 68 and at the other end to valve 84. A fourth conduit 92 is connected at one end to third conduit 90 and at the other end to aperture 82.

In operation when the motor 38 is actuated by supplying electrical current to same through cord 39, the driving relationship provided drives both the spindle 29, including chuck 32 holding drill bit 33, and the pump 68 of the hydraulic actuating means.

Pump 68 pumps fluid from outlet 82 through conduits 92, 90, 88, and 86 to inlet 80 to force piston 60 upwardly when the valve 84 is in closed position. Movement of piston 60 moves the work support 52 upwardly forcing any work positioned on table 58 against the drill bit 33. When the work is in contact with drill bit 33 the operator of the drill press opens valve 84 slightly. A portion of the hydraulic fluid pumped by pump 68 is then recirculated through valve 84 through conduits 86 and 90. The pressure exerted on the bottom of the piston 60 can be very easily and simply adjusted by valve 84 to the desired position. The more closed the valve 84 is, the greater will be the pressure drop across it, and the greater the pressure will be that is applied to piston 60. If the feed rate, that is movement of work table 58 against drill bit 33, is too fast the resulting rotational resistance of the drill bit will slow down the motor 38. The motor in slowing down also slows down the rate at which pump 68 pumps fluid. When the pumping rate is reduced the pressure drop across valve 84, and consequently the pressure against the bottom of piston 60 is reduced thereby automatically decreasing the pressure or feed rate. When it is desired to move the work support downwardly the valve 84 is completely opened. Then, the fluid pumped by pump 68 is recirculated completely through valve 84. The weight of work support 52 is sufficient to force fluid through aperture 80 back to the reservoir above piston 60. When hydraulic fluid is desired to be added to the system it is merely poured into the open top of post 16.

If desired the preferred hydraulic system shown in FIG. 3 can be modified if necessary or desirable. The fluid conduits and valve can be modified to provide completely recirculating the fluid pumped by the pump while locking the fluid below piston 60 to thereby hold the platform in an immovable position regardless of the speed of the motor 38.

While I have described and illustrated preferred specific embodiments of my invention, it is understood that the drill press apparatus and elements thereof disclosed can be made in other forms than hereindescribed or suggested without departing from the spirit of my invention.

I claim:
1. A drill press comprising, a broad circular base member having an elevated flat horizontal mounting flange, a long hollow cylindrically shaped upright post having a flange on the bottom thereof, bolt means joining the flange on said post to the mounting flange on said base member, a first stationary horizontally disposed platform on the top of said post comprised of, an annular clamp secured to the top portion of said post, and two parallel lengths of angle iron secured to said annular clamp and disposed in a horizontal position, a spindle means on one end of said first platform, said spindle means comprised of, a vertically extending shaft, a drill chuck on the lower end of said shaft, a relatively large bevel gear rigidly mounted on the top opposite end of said vertically extending shaft, and a first bearing means mounted on the end of said first platform rotatably supporting said vertically extending shaft, an electric motor having a protruding driving shaft mounted on said first platform on the end opposite said spindle means, a first horizontal shaft, coupling means connecting the driving shaft of said motor and said horizontal shaft, a relatively small bevel gear rigidly mounted on the end of said first horizontal shaft and positioned in operative driving relationship to said relatively large bevel gear on said spindle means, a second bearing means mounted on said platform adjacent said spindle means supporting said first horizontal shaft, a second horizontally disposed platform positioned in spaced relation below said first platform and mounted on said upright post, said second platform having an annular clamp means encircling said upright post, and a diagonal brace having one end secured to said post at a point below said second platform and the other end secured to said second platform at a point spaced from said upright post, a second bearing means mounted on the end of said second platform aligned with said first bearing means operatively supporting said vertically extending shaft, a movable work support slidably mounted on said upright post below said second platform comprising, two spaced parallel rods positioned transversely of said upright post, relatively large annular portions on adjacent ends of each of said rods encircling said post in slidable relation thereto, relatively small aligned annular portions on adjacent opposite ends of each of said rods, a flat work table, and a tubular rod secured to the bottom of said work table disposed in said relatively small annular portions and supported by said spaced parallel rods, a piston slidably disposed in said upright post, spaced piston rods rigidly joined to said piston extending upwardly with tip portions extending beyond the top of said post, said top extending portions of said piston rods being positioned on opposite sides of said first horizontal shaft, two vertically extending work support rods, the lower ends of said lastmentioned rods secured to said work support and the upper ends extending through apertures in said first platform and above the top surface thereof, a bracket means secured to the upper ends of said piston rods and the upper ends of said work support rods, tubular shaped abutment means disposed about each of the extending top portions of said work support rods and positioned between the first platform and said bracket means, a hydraulic actuating means for said work support comprising, a rotary fluid pump having an inlet, an outlet, and a shaft mounted on said second platform, a bevel gear on the last mentioned shaft, a bevel gear secured to said vertically extending shaft of said spindle means in driving relationship to said bevel gear on said pump, a first aperture in the lower end of said post disposed between the bottom thereof and said piston, a second aperture in said post positioned above top limit of movement of the piston, a manually operated valve, a first conduit connected at one end to said first aperture and at the opposite end to said valve, a second conduit connected at one end to said first conduit and the opposite end to the outlet of said pump, a third conduit means connected at one end to the inlet of said pump and at the other end to said valve, and a fourth conduit connected at one end to said third conduit and said second aperture, said drill press adapted in use to move with said work table the work against a drill held in chuck utilizing the energy of the motor to drive the chuck and move the work table.

2. A drill press comprising a base, a hollow upright post secured to said base, a first horizontally disposed platform on the top of said post, a spindle means at one end of said first platform, said spindle means having a vertically extending shaft, a drill chuck on the lower end of said vertically extending shaft, a first bevel gear mounted on the top end of said vertically extending shaft opposite said drill chuck, and a first bearing means supporting said vertically extending shaft, a motor mounted on said first platform, a second bevel gear, means connecting said second bevel gear and said motor, said second bevel gear being positioned in operative driving relationship to said first bevel gear on said spindle means, a second horizontally disposed platform positioned in spaced relation below said first platform and mounted on said post, a second bearing means mounted on said second platform aligned with said first bearing means operatively supporting said vertically extending shaft, a movable work support slidably mounted on said post below said second platform comprising, a flat work table, and support means joined to said work table and supporting same in slidable relationship to said post, a piston slidably disposed in said hollow upright post, piston rod means rigidly joined to said piston extending upwardly with the top portions thereof extending beyond the top of said hollow upright post, vertically extending work support rod means, the lower end of said last-mentioned rod means secured to said work support and the upper end extending above the top surface of said first platform, a bracket means secured to the upper end of said piston rod means and the upper end of said work support rod means, a hydraulic actuating means for said work support comprising, a fluid pump having an inlet, an outlet, and a shaft mounted on said second platform, a third bevel gear on said last-mentioned shaft, a fourth bevel gear secured to said vertically extending shaft of said spindle means in driving relationship to said third bevel gear on said pump shaft, a first aperture in the lower end of said hollow post disposed between the bottom thereof and said piston, a second aperture in said post positioned above the top limit of movement of said piston, a valve, a first conduit connected at one end to said first aperture and at the opposite end to said valve, a second conduit connected at one end to said first conduit and at the opposite end to the outlet of said pump, a third conduit means connected at one end to said inlet of said pump and at the other end of said valve, and a fourth conduit connected at one end to said third conduit and the opposite end to said second aperture, said drill press adapted in use to utilize the energy of the motor to drive the chuck and move the work table.

3. A drill press comprising, a base, a hollow upright post mounted on said base, a first platform mounted on said post, a spindle means, said spindle means having a vertically extending shaft, a drill chuck on the lower end of said shaft, a first gear means rigidly mounted on said vertically extending shaft, and a bearing means mounted on said first platform rotatably supporting said vertically extending shaft, a motor having a protruding drive shaft mounted on said first platform, second gear means associated with said motor shaft operatively engaging said first gear means on said vertical shaft, a second platform mounted on said hollow post, a second bearing means mounted on said platform aligned with said first bearing means operatively supporting said vertically extending shaft of said spindle means, a movable work support comprising, a work table, and a support means for said work table slidably mounted on said hollow post, a piston means slidably disposed within said hollow post, piston rod means joined to said piston extending upwardly with a top portion extending beyond the top of said post, a means to support said work support joined to said work support, a bracket means secured to the upper portion of said piston rod means and to said means to support said work support, a hydraulic actuating means for said work support comprising, a fluid pump mounted on said second platform, drive means on said pump and said vertical shaft connecting same in operative driving relationship, a first aperture in said post adjacent the bottom thereof, a second aperture in said post positioned above the top limit of movement of said piston, a valve means, a first conduit means adapted to transfer fluid via said pump from said second aperture to said first aperture, a second conduit means adapted to provide a passage to adjustably transfer fluid from said first aperture to said second aperture and provide a recirculation passage for all or any portion of fluid moved by said pump, said drill press adapted in use to utilize the energy of said motor to drive said chuck and move said work support.

4. A cutting apparatus comprising, a base, a hollow upright post mounted on said base, a spindle means having a vertically extending shaft, a means to hold a cutting tool on the lower end of said shaft, a bearing means adapted to rotatably support said vertically extending shaft, a motor means, drive means for transmission of driving energy from said motor to said vertically extending shaft, a support means on said hollow post for supporting said motor and said spindle means, a movable work support on said upright post adapted to move relative to said vertically extending shaft, a piston means slidably disposed in said upright hollow post, piston rod means rigidly joined to said piston means, hanger means joined at one end to said work support, means joining said piston rod means and the opposite end of said hanger means for said work support, a hydraulic actuating means for said work support comprising, a fluid pump, drive means for transmitting driving energy from said motor to said fluid pump, a valve means, a first aperture in said post below said piston means, a second aperture in said post positioned above said piston means, a first conduit means adapted to transfer fluid with said pump from said second aperture to said first aperture, a second conduit means having said valve therein adapted to provide a conduit to adjustably pass fluid from said first aperture to said second aperture, said drill press adapted to utilize the energy of said motor to drive said spindle means and move said work table.

References Cited by the Examiner
UNITED STATES PATENTS

| | | | |
|---|---|---|---|
| 727,142 | 5/1903 | Isler | 77—5 |
| 2,418,841 | 4/1947 | Karweit | 77—33.5 |
| 2,711,549 | 6/1955 | Hirvonen | 77—33.8 |
| 2,876,664 | 3/1959 | Gurney | 77—33.5 |

FOREIGN PATENTS

| | | |
|---|---|---|
| 707,516 | 4/1954 | Great Britain. |

FRANCIS S. HUSAR, *Primary Examiner.*